US007080739B2

(12) United States Patent
Guy et al.

(10) Patent No.: US 7,080,739 B2
(45) Date of Patent: Jul. 25, 2006

(54) POSTAL SORTING MACHINE INCLUDING A BIN-TRANSFER STRUCTURE

(75) Inventors: Forella Guy, Saint-Peray (FR); Gillet François, Lyons (FR)

(73) Assignee: Solystic, Gentilly (FR)

( * ) Notice: Subject to any disclaimer, the term of this patent is extended or adjusted under 35 U.S.C. 154(b) by 0 days.

(21) Appl. No.: 10/511,301

(22) PCT Filed: Jul. 15, 2004

(86) PCT No.: PCT/FR2004/050338

§ 371 (c)(1), (2), (4) Date: Oct. 15, 2004

(87) PCT Pub. No.: WO2005/028127

PCT Pub. Date: Mar. 31, 2005

(65) Prior Publication Data

US 2005/0224399 A1 Oct. 13, 2005

(30) Foreign Application Priority Data

Sep. 17, 2003 (FR) .................................. 03 50563

(51) Int. Cl.
*B07C 3/00* (2006.01)
*B65G 37/00* (2006.01)

(52) U.S. Cl. .................................... 209/630; 198/369.1

(58) Field of Classification Search ................ 209/584, 209/630, 922; 414/285; 198/465, 369.1, 198/370.03, 370.06

See application file for complete search history.

(56) References Cited

U.S. PATENT DOCUMENTS

| | | | | |
|---|---|---|---|---|
| 3,738,506 | A * | 6/1973 | Cornford et al. | 414/273 |
| 4,203,696 | A * | 5/1980 | Lindberg | 414/331.09 |
| 5,226,782 | A * | 7/1993 | Rigling | 414/283 |
| 5,379,229 | A * | 1/1995 | Parsons et al. | 700/215 |
| 5,385,243 | A * | 1/1995 | Jackson et al. | 209/509 |
| 6,026,967 | A * | 2/2000 | Isaacs et al. | 209/539 |
| 6,095,347 | A * | 8/2000 | Mauro-Vetter | 211/151 |
| 6,201,203 | B1 * | 3/2001 | Tilles | 209/584 |
| 6,501,041 | B1 | 12/2002 | Burns | |
| 6,561,339 | B1 * | 5/2003 | Olson et al. | 198/349 |

FOREIGN PATENT DOCUMENTS

| | | | |
|---|---|---|---|
| FR | 2622770 | A1 * | 5/1989 |
| WO | WO 00/53344 | A | 9/2000 |

* cited by examiner

*Primary Examiner*—Joseph C. Rodriguez
(74) *Attorney, Agent, or Firm*—Sughrue Mion, PLLC

(57) ABSTRACT

A postal sorting machine (1) comprises sort outlets (7) distributed in one or more horizontal rows that are superposed and parallel. A bin transfer structure (3) is placed along said rows of sort outlets (7), said transfer structure (3) comprising one or more superposed bin conveyors (9) extending parallel to respective rows of sort outlets and one or more superposed gangways (10) that are movable along the rows of sort outlets (7), each extending between a row of sort outlets (7) and a corresponding bin conveyor (9) to enable at least one storage bin (4) to be transferred from a sort outlet (7) to a corresponding bin conveyor (9).

9 Claims, 3 Drawing Sheets

FIG_4
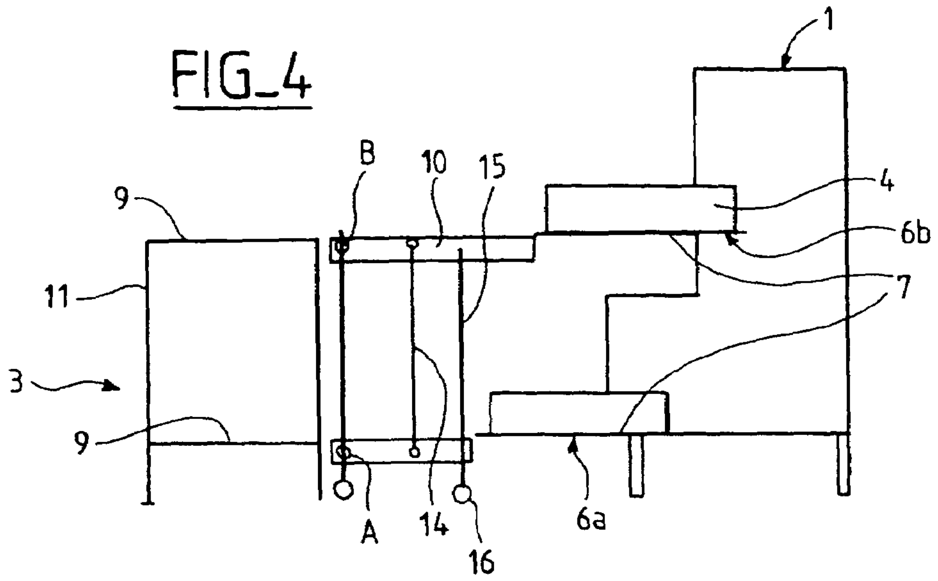
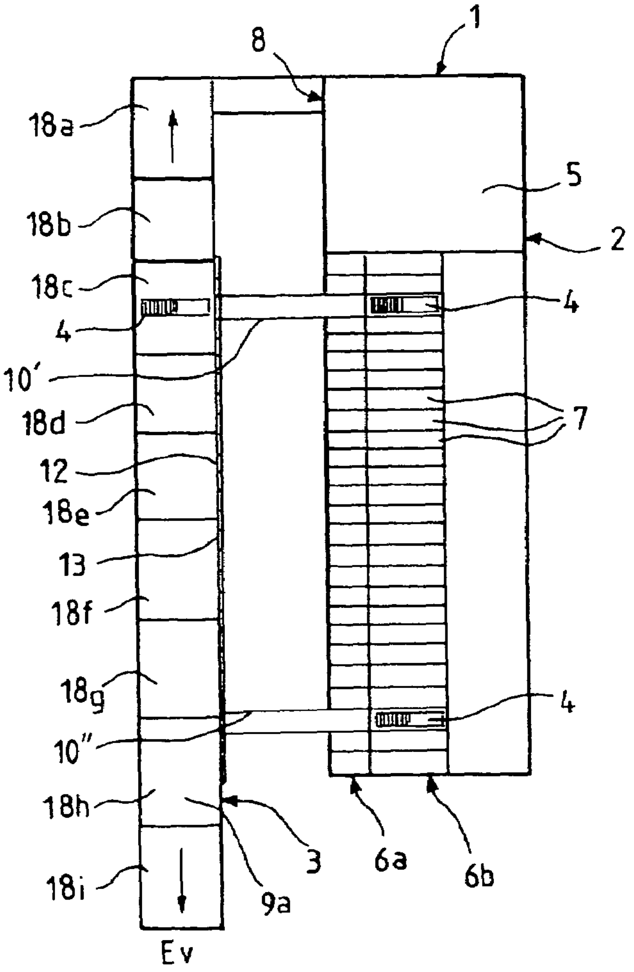
FIG_5

POSTAL SORTING MACHINE INCLUDING A BIN-TRANSFER STRUCTURE

BACKGROUND OF THE INVENTION

The present invention relates to a postal sorting machine having sorting outlets distributed over one or more horizontal rows that are superposed and parallel, and in which each sorting outlet is provided with a bin for storing postal articles. The invention extends to so-called two-sided sorting machines having sorting outlets on both of two sides.

The invention applies most particularly to a machine working in one or more passes in order to sort postal letters, and it relates in particular to a sorting machine capable of preparing postal delivery rounds or "walks" in one, two, or three passes. More particularly, the invention applies to a sorting machine capable, in two passes, of preparing about one hundred delivery rounds, or more depending on the number of sort outlets.

At present, in order to prepare delivery rounds, postal articles are inserted for a first pass into the sorting machine and are sorted a first time into sort outlet receptacles. Each receptacle is emptied manually into a storage bin provided for this purpose that is positioned in a structure or a carriage. The structures or carriages containing the storage bins are then transferred in a defined order to the inlet of the sorting machine so that the postal articles are reinserted into the machine for a second pass. At the end of the second pass, the receptacles contain the postal articles properly sorted for delivery rounds, and their contents are transferred into the storage bins. The storage bins are then taken to a removal point so that they can be taken by postmen and women.

Prior to the invention, the operation of reloading the machine between the first and second passes was performed entirely manually. In order to take the sort outlet storage bins to the inlet of the machine, the operators made use of carriages on which the storage bins were stowed temporarily. In order to prepare delivery rounds in two passes, operators had to extract the bins from the sort outlets in a precise order and had to reinsert them into the sorting machine in the same order. That resulted in a risk of bins being interchanged during temporary storage on the carriage, having the effect of introducing malfunction into the preparation of delivery rounds. Furthermore, at the end of the second pass, the operators had to take the storage bins to a removal point remote from the sorting machine, thereby further increasing handling operations. In addition, such handling operations increase the time required for preparing delivery rounds.

As a result, preparing delivery rounds with such sorting machines takes a long time, requires a great detail of handling, and requires considerable attention to be paid by the operators.

SUMMARY OF THE INVENTION

The object of the present invention is to remedy the above drawbacks by proposing a postal sorting machine which minimizes manual operations, reduces reloading time, and reduces the risk of bins being interchanged between two sorting passes.

To this end, the invention provides a postal sorting machine having sort outlets distributed in one or more horizontal rows that are superposed and parallel, the machine being characterized in that a bin transfer structure is disposed along said rows of sort outlets, said transfer structure comprising one or more superposed bin conveyors extending parallel to respective rows of sort outlets, and one or more superposed gangways that are movable along the rows of sort outlets, each extending between a row of sort outlets and a corresponding bin conveyor to enable at least one storage bin to be transferred from a sort outlet to a corresponding bin conveyor. To transfer storage bins either to the inlet of the sorting machine in order to perform a new pass, or else to a removal point, the operator needs only to slide the storage bins from the sort outlets along the gangways to the conveyors, with the conveyors then transferring the storage bins to the desired locations. The time needed for the operation and the effort required of the operator are small since there is no need for the operator to change position, it sufficing merely to slide the storage bins without lifting them. The actions that the operator needs to undertake are simple, so there is very little risk of the order of the storage bins being interchanged, even at the end of the second sorting pass.

In a particular embodiment of the invention, the sorting machine has a row of sort outlets, a bin conveyor, and a corresponding gangway that are disposed substantially in the same horizontal plane.

In particular embodiments of the invention, the conveyors are either belt conveyors or else accumulation conveyors.

In a particular embodiment of the invention, the conveyors are arranged to move the storage bins in two opposite directions so as to be capable of taking the storage bins at one end towards an inlet of the sorting machine, and at the other end towards a bin removal point.

In a particular embodiment of the invention, each gangway includes a set of parallel idler rollers on which the storage bins are placed.

In a particular embodiment of the invention, each gangway is arranged to be capable of being raised or lowered, or of being withdrawn.

In particular embodiments of the invention, each gangway is mounted on a wheeled carriage, or else on a frame of the corresponding bin conveyor.

BRIEF DESCRIPTION OF THE DRAWINGS

Various embodiments of the invention are described below and shown in the drawings.

FIG. 4 shows a transfer structure in which the gangways are mounted on a carriage in accordance with the invention.

FIG. 5 shows a transfer structure with two pairs of gangways in accordance with the invention.

DETAILED DESCRIPTION OF THE INVENTION

Figure 1:
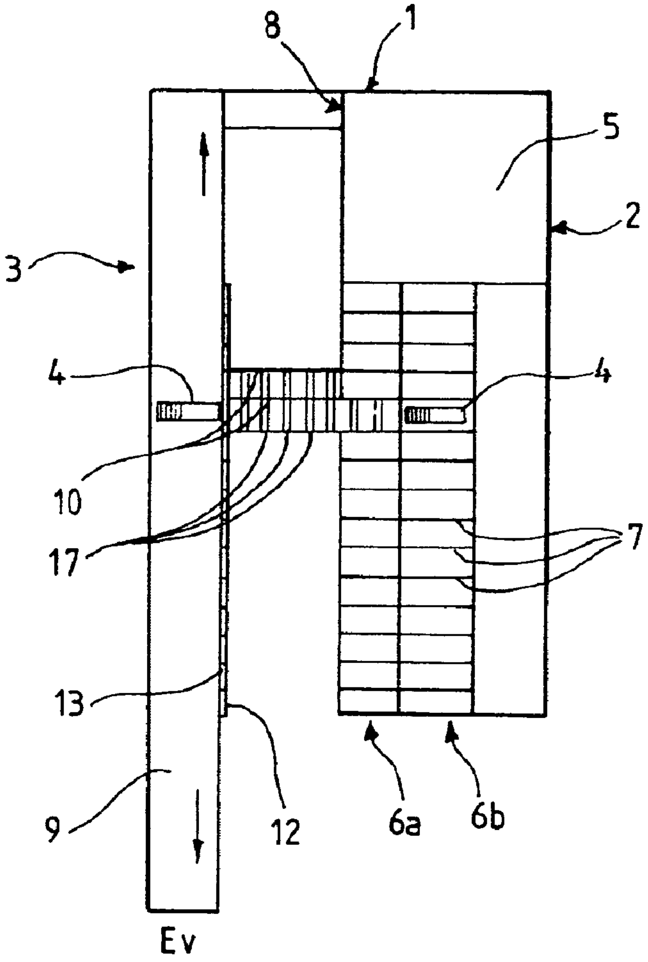
FIG. 1 is a highly diagrammatic plan view of a postal sorting machine with a bin transfer structure in accordance with the invention.
Figure 1A:
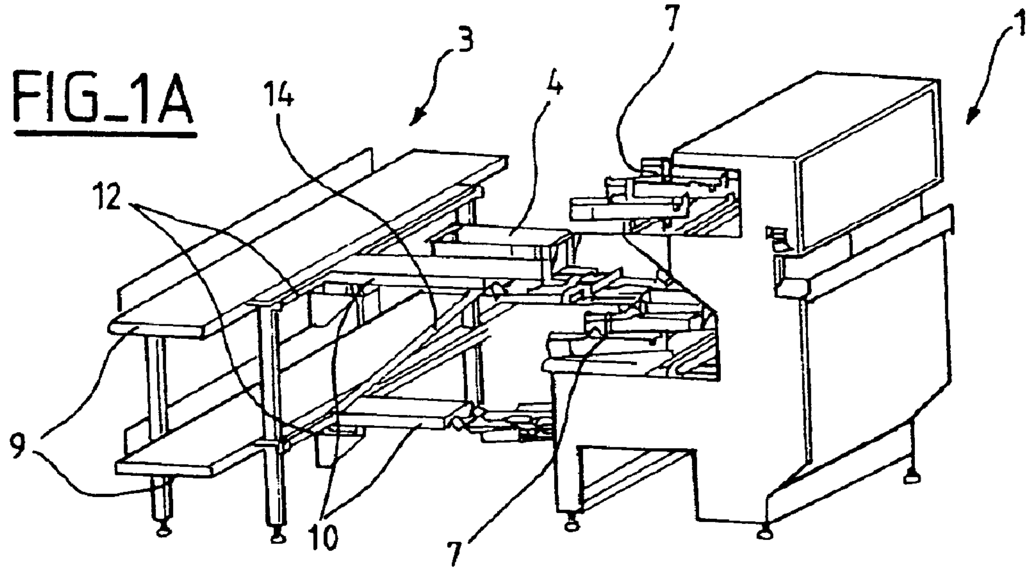
FIG. 1A is a more detailed perspective view of the bin transfer structure of the invention.

FIGS. 1 and 1A show a postal sorting machine 1 constituted by a sorting unit 2 and a transfer structure 3 for transferring storage bins 4.

The sorting unit 2 comprises a unit 5 for receiving and recognizing postal articles, and, in this example, it comprises a unit having two horizontal rows 6*a* and 6*b* of sort outlets 7, with bins 4 for storing postal articles in the vicinity of the sort outlets 7 and with the rows being superposed and parallel. The postal articles are inserted into the sorting unit 2 via an inlet 8 of the machine.

The transfer structure 3 is made up of two superposed conveyors 9 (more clearly visible in FIGS. 2, 3, and 4), e.g.

belt conveyors arranged parallel to the rows 6*a* and 6*b* of sort outlets 7, and two gangways 10 (more visible in FIGS. 2, 3, and 4) that are movable along the rows of sort outlets, each being disposed between one of the rows 6*a,* 6*b* of sort outlets 7 and a conveyor 9. The conveyors 9 are both-way conveyors extending between the inlet 8 and a removal point referenced Ev in FIG. 1. The gangways 10 which extend perpendicularly to the rows 6*a,* 6*b* of sort outlets 7 in FIGS. 1 and 1A are movable so as to travel along the rows 6*a,* 6*b* of sort outlets 7.

During a two-pass sorting operation for preparing delivery rounds, an operator places the postal articles in the inlet 8 of the postal sorting machine 1, with the articles being inserted therefrom into the unit 5 for receiving and recognizing postal articles, which units then controls the switching of the postal articles to the various sort outlets 7. Once they have been sorted, the postal articles are to be found in the receptacles and they need to be transferred manually into the storage bins 4 placed at each sort outlet 7. In order to finish off preparing delivery rounds, the storage bins 4 are returned in sequence to the inlet 8 via the transfer structure 3 so as to perform a second sorting pass on the postal articles. An operator pushes the storage bins 4 over the gangways 10 from the sort outlets 7 onto the conveyors 9. Once the two-pass sorting operation has been completed, the storage bins 4 are taken from the sort outlets 7 to the removal point Ev for the storage bins 4, which point is located at a distance from the postal sorting machine 1 so that the bins can be stored ready to be taken by postmen and women.

Figure 2:
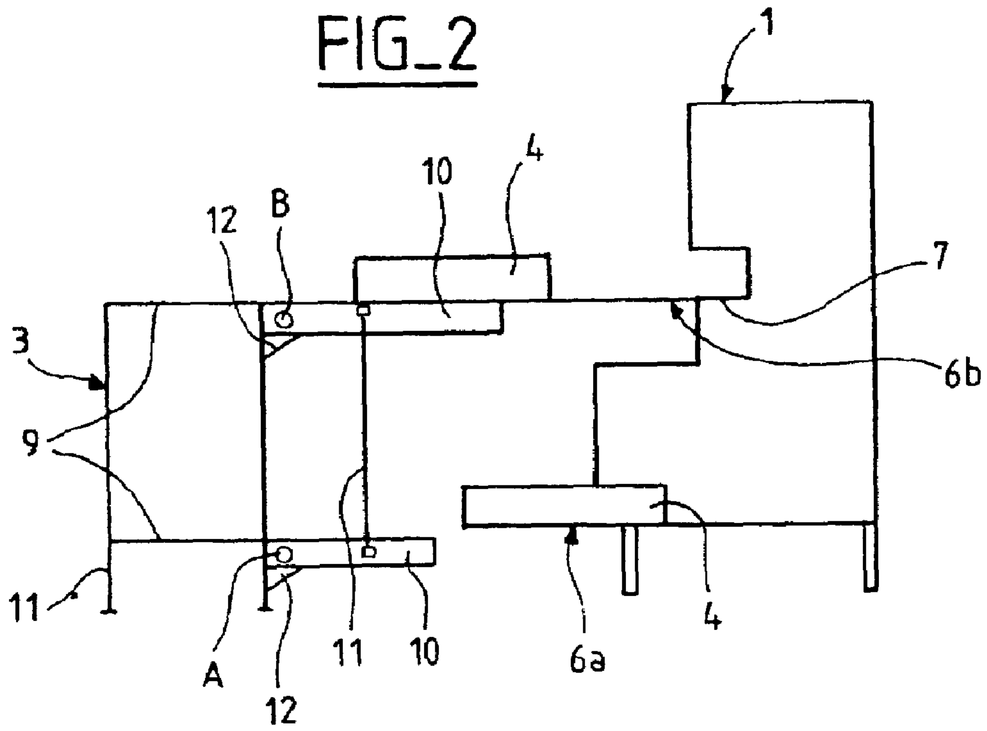
FIG. 2 is a highly diagrammatic side view of the transfer structure of the sorting machine having gangways in the lowered position in accordance with the invention.

In FIG. 2, it can be seen that the two rows 6*a* and 6*b* of sort outlets 7 are superposed and offset relative to each other in a vertical plane, i.e. that the top gangway is longer than the bottom gangway, thereby facilitating access to the storage bins 4. Each of the two rows 6*a,* 6*b* of sort outlets 7 corresponds to a respective gangway 10 and a respective conveyor 9, with these elements being located substantially in the same horizontal plane in order to enable an operator to slide the storage bins 4 contained in the sort outlet 7 from the sort outlets 7 onto the conveyor 9 without any need to lift the bins.

The two superposed conveyors 9 are arranged on a stationary frame 11. The gangways 10 are engaged on the frame 11 for the conveyors 9 by means of slideways 12 and are capable of sliding along the rows 6*a,* 6*b* of sort outlets 7. In FIG. 1, it can be seen that travel of the gangways along the slideways 12 is indexed by means of notches 13 so as to ensure that the gangways 10 come to rest in register with the sort outlets 7. The gangways 10 shown in their horizontally lowered position in FIG. 2 can be pivoted about axes A and B so as to be raised like drawbridges. The two gangways 10 are interconnected by a hinged bar 14 so as to be moved simultaneously along the rows 6*a,* 6*b* of sort outlets 7 and so as to be lowered and raised simultaneously.

Displacing the two gangways 10 simultaneously along the conveyor 9 serves to reduce the amount of maneuvering and the risk of error in the order in which the storage bins 4 are conveyed from the outlets to the inlet of the sorting machine 1. The operator thus causes the storage bins to slide along the gangways 10 one by one from the sort outlets 7 onto the conveyors 9 in a particular order. The operator begins at one end of the rows 6*a,* 6*b* emptying the top sort outlet 7 and then the bottom sort outlet 7, after which the operator shifts both gangways 10 simultaneously by one notch 13 or one sort outlet 7 by actuating a lever or a pusher so as to move the gangways 10 in indexed manner, after which the operator empties the top sort outlet 7 and then the bottom sort outlet 7, and so on until all of the storage bins have been transferred. The storage bins thus arrive in a predetermined order at the inlet of the postal sorting machine 1, or at the bin removal point (not shown in FIG. 2) at a respective end of the conveyors 9.

The transfer structure 3 thus avoids any need for the operators to lift the storage bins 4 or to go back and forth between the inlet of the postal sorting machine 1 and the sort outlets 7. In addition, the risk of error in the order in which the storage bins 4 are transferred while reinserting the postal articles into the postal sorting machine 1 is reduced, since the maneuvers that need to be performed are simple, and the storage bins 4 are no longer placed temporarily on wheeled carriages in order to transfer the storage bins 4 to the inlet of the postal sorting machine 1.

Figure 3:
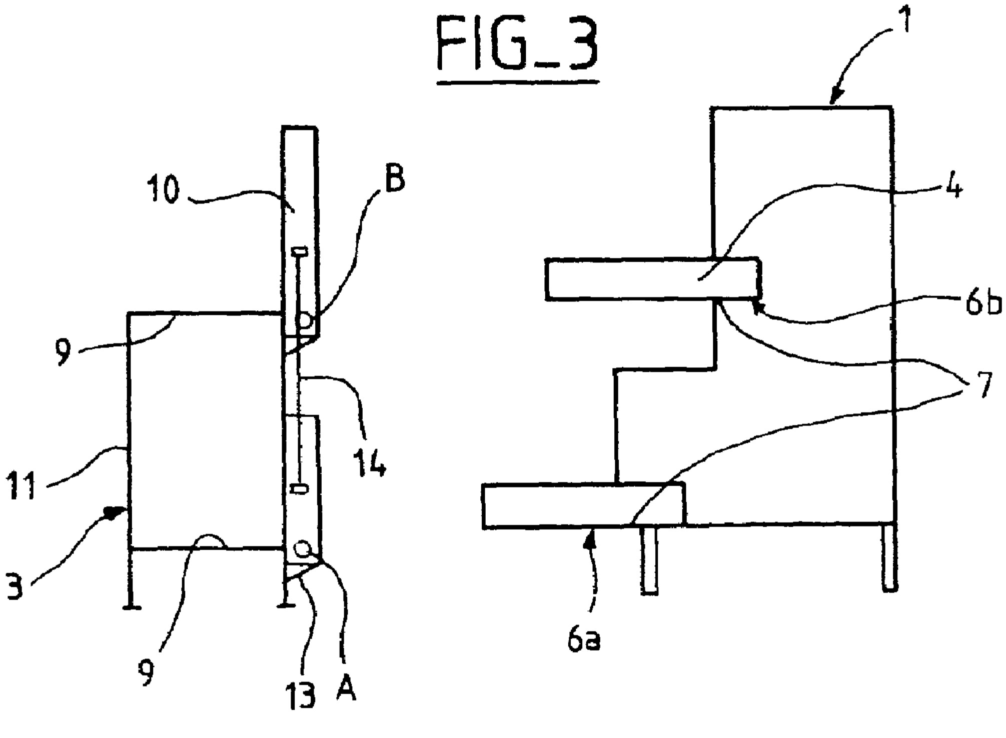
FIG. 3 is analogous to FIG. 2 but shows the gangways of the transfer structure in the raised position.

FIG. 3 shows the gangways 10 in the vertically raised position. This position serves to leave a completely empty space between the conveyor 9 and the rows 6*a,* 6*b,* enabling operators to move between them. Provision can be made for the gangways 10 to engage the frame 11 of the conveyors 9 in removable manner so as to enable them to be withdrawn.

FIG. 4 shows a postal sorting machine 1 with a bin transfer structure 3 having two gangways 10 mounted on a wheeled carriage 15, which gangways are not secured to the frame 11 of the conveyors 9. The carriage 15 includes wheels 16 so as to enable it to be moved easily along the superposed conveyors 9.

FIG. 5 shows a postal sorting machine 1 with a bin transfer structure 3 made up of accumulation conveyors 9*a.* Such conveyors 9*a* are known and operate with sensors for moving the storage bins 4 stepwise. The various accumulation zones of the conveyors 9*a* are referenced 18*a*–18*i* in FIG. 5.

FIG. 5 also shows a transfer structure 3 having two pairs of gangways 10', 10". For a postal sorting machine 1 presenting a very large number of sort outlets 7, it can be advantageous to reduce the time required for transferring storage bins 4 between two passes by doubling the number of gangways 10', 10" for each of the rows 6*a,* 6*b* of sort outlets 7. Two operators begin transferring storage bins 4 from respective opposite ends of the rows 6*a,* 6*b* of sort outlets 7 and they move towards each other while emptying the sort outlets 7, until they meet.

FIG. 1 shows a transfer structure 3 in which the two gangways 10 are offset in a vertical plane extending transversely to the rows of sort outlets, with this having the advantage of providing good accessibility for the operator to the bottom gangway.

In FIG. 1, it can be seen that the gangways 10 are fitted with a set of parallel idler rollers 17 on which the storage bins 4 are moved.

Clearly the invention is not limited in any way to the embodiments described above, but extends to any variant that is obvious to the person skilled in the art, and in particular to a postal sorting machine having one or more superposed rows of sort outlets, in which each row of sort outlets has a corresponding gangway and bin conveyor of the bin transfer structure in register therewith.

The invention claimed is:

1. A postal sorting machine (1) having sort outlets (7) distributed in one or more horizontal rows (6*a*, 6*b*) that are superposed and parallel, wherein a bin transfer structure (3) is disposed along said rows (6*a*, 6*b*) of sort outlets (7), said transfer structure (3) comprising one or more superposed bin conveyors (9) extending parallel to respective rows (6*a*, 6*b*) of sort outlets, and one or more superposed gangways (10; 10', 10") that are movable along the rows (6*a*, 6*b*) of sort outlets (7), each extending between a row (6*a*, 6*b*) of sort outlets (7) and a corresponding bin conveyor (9) to enable at least one storage bin (4) to be transferred from a sort outlet (7) to a corresponding bin conveyor (9) said superposed gangways being offset from one another in a vertical plane extending transversely to the rows of sort outlets.

2. The postal sorting machine (1) according to claim 1, in which a corresponding row (6*a*, 6*b*) of sort outlets (7), bin conveyor (9), and gangway (10) are disposed substantially in the same horizontal plane.

3. The postal sorting machine (1) according to claim 1, in which each conveyor (9) is a belt conveyor.

4. The postal sorting machine (1) according to claim 1, in which each conveyor (9*a*) is an accumulation conveyor.

5. The postal sorting machine (1) according to claim 1, in which the conveyors (9) are arranged to move the storage bins (4) in two opposite directions so as to be capable of taking the storage bins (4) at one end towards an inlet (8) of the sorting machine (1), and at the other end towards a bin removal point (Ev).

6. The postal sorting machine (1) according to claim 1, in which each gangway (10) includes a set of parallel idler rollers (17) on which the storage bins (4) are placed.

7. The postal sorting machine (1) according to claim 1, in which each gangway (10) is arranged to be capable of being raised or lowered, or of being withdrawn.

8. The postal sorting machine (1) according to claim 1, in which each gangway (10) is mounted on a wheeled carriage (15).

9. The postal sorting machine (1) according to claim 1, in which each gangway (10) is mounted on a frame (11) of the corresponding bin conveyor (9).

* * * * *